United States Patent [19]

Ewers

[11] 4,245,958
[45] Jan. 20, 1981

[54] VERTICAL AXIS WIND TURBINE

[76] Inventor: Marion H. Ewers, P.O. Box 526, La Veta, Colo. 81055

[21] Appl. No.: 962,859

[22] Filed: Nov. 22, 1978

[51] Int. Cl.³ .............................................. F03D 11/04
[52] U.S. Cl. ................................... 416/197 A; 416/9; 416/124; 415/2 R
[58] Field of Search .................. 415/2 R; 416/197 A, 416/DIG. 6, 121 A; 52/654, 655

[56] References Cited

U.S. PATENT DOCUMENTS

| | | | |
|---|---|---|---|
| 1,521,422 | 12/1924 | Boyd | 52/654 |
| 1,974,008 | 9/1934 | Biehn | 415/2 R |
| 2,059,356 | 11/1936 | James | 416/DIG. 6 X |
| 2,224,851 | 12/1940 | Lea | 416/197 A |
| 2,431,111 | 11/1947 | Du Brie | 415/2 |
| 2,436,747 | 2/1948 | Du Brie | 416/197 A X |
| 2,658,776 | 11/1953 | Wilcox | 52/655 |
| 3,938,907 | 2/1976 | Magoveny et al. | 415/4 X |
| 4,118,637 | 10/1978 | Tackett | 290/55 |
| 4,134,707 | 1/1979 | Ewers | 415/4 |

FOREIGN PATENT DOCUMENTS

| | | | |
|---|---|---|---|
| 455463 | 3/1949 | Canada | 416/197 A |
| 2715919 | 10/1978 | Fed. Rep. of Germany | 416/121 A |
| 365643 | 3/1907 | France | 416/9 |

*Primary Examiner*—Everette A. Powell, Jr.

[57] ABSTRACT

The disclosure teaches improvements in vertical axis wind turbine apparatus. The improved apparatus has a vertically rising exoskeletal frame which permits modular addition of supplemental turbine components to the apparatus. The apparatus is self-supporting, needing no bracing external of the frame, is relatively small and light weight, has vertical standards in the frame, a plurality of sets of horizontal stretchers integrating the standards and means for bracing the frame elements. The specification teaches the support of the axially disposed drive shaft and associated turbines by means of upwardly and radially inwardly extending arms which distribute the weight of the operating structure to the exoskeletal frame. Non-bearing guide means are provided to prevent lateral movement of the shaft and associated turbines. The apparatus may be provided in kit form which can be readily assembled or disassembled according to need.

The guide bearings permit the drive shaft to move vertically to accommodate longitudinal expansions of the frame.

The turbine is self governing and requires no separate speed governing apparatus, and grossly equalizes pressures on the tower on the windward and leeward sides.

10 Claims, 6 Drawing Figures

_4,245,958_

VERTICAL AXIS WIND TURBINE

BACKGROUND OF THE INVENTION

This invention relates to windmills, particularly to windmills of the turbine type and improvements thereon.

The art of making windmills and wind turbines is an ancient one. However, there has always been the problem of obtaining power in sufficient quantity without making the apparatus too heavy, cumbersome or expensive or too complex, such as for example, one that has too many working parts which might malfunction. Another problem has been that windmills tend to take up too much space. Furthermore, they are for the most part unsightly and, therefore, subject to objection on that account.

RELATED PATENT

The subject application is related to U.S. Pat. No. 4,134,707, issued on Jan. 16, 1979 to the same inventor as the subject application.

BRIEF SUMMARY OF THE INVENTION

With the purpose of overcoming the aforementioned disadvantages and of improving upon the existing wind turbines available to the industry, I have devised an improved vertical axis wind turbine apparatus which is fashioned in discrete segments which may be joined together to form a unitary whole to multiply its capacity, responsive to differing performance standards.

I have devised a light weight, vertical axis wind turbine apparatus whose height can be varied incrementally according to the number of segments employed, which does not require a tail or speed governer and which does not require externally applied bracing, such as guide wires or the like.

The turbine construction is compact and efficient, requiring a minimal amount of ground space, and esthetically pleasing. It requires no wind shield or other speed governing apparatus to function satisfactorily.

The apparatus presents a vertically rising exoskeletal frame which has at least three vertical standards and in a preferred embodiment four vertical standards. It also has a plurality of sets of horizontal stretchers defining a number of sides corresponding to the number of standards, as for example, three in the case of three vertical standards, four in the case of four vertical standards. The stretchers peripherally integrate the standards and in a preferred embodiment, the horizontal stretchers are joined at the corners by vertical sleeves which are adapted to receive the vertical standards rising from that set of stretchers and those supporting that set of stretchers.

It has been found feasible to make the standards and stretcher elements readily detachable at their junctures such that particular segments of the structure may be removed if desired. Cross bracing joins each of the sets of stretchers to at least one other set of stretchers and it has been found desirable that the braces be offset. For example, the braces are secured to one set of stretchers somewhat inwardly from the corners and rise and cross each other and are secured to the next set of stretchers nearer the corners of the stretchers. The next set of braces is again set somewhat inwardly from the corners and likewise they rise and cross each other and are joined to the next upper set of stretchers more toward the corners. This pattern is repeated.

I also provide guide means which are, in a preferred practice of the invention, a plurality of ribs that converge radially from the periphery of the frame where they meet and are attached to an axially disposed set of guide bearings.

There also is provided support means for the drive shaft and the turbines which in the case of a triangular structure would have at least three arms attached at their first ends to the frame at the junctures of the stretchers and standards from whence the arms would be supported. The arms extend upward and inward to connect to a concentrically disposed thrust bearing. The thrust bearing by this means supports all of the drive shaft and its associated turbine blades above the bearing, and the weight of the shaft and turbines is thereby distributed to the exoskeletal frame.

The turbine is made up of an upper and lower wheel each of which has a rim and a hub and a plurality of spokes connecting the two. In addition to the spokes, there are a plurality of curved vane guides on each wheel which extend generally from the rim to the hub, although it would be feasible to extend the vane guides from an outer portion of the spokes to an inner portion of the spokes without touching either the rim or the hub. Accordingly, when herein I speak of extending the vane guides from the rim to the hub, I contemplate this permissible variation in the literal meaning of the word.

The vanes themselves are attached to and shaped by the vane guides which are curved to better act as sails to catch the wind. It is important that these vanes be shorter than the vane guides and avoid extending to the hub, so that a substantial space is allowed around the shaft free and clear of obstruction. I provide means for bracing the curved vanes to better maintain the curve, inasmuch as the vanes themselves may economically be made out of light gauge metal. The bracing may either take the form of stringers running from one lengthwise edge to the other or by crimping the vanes across the short dimension as in a barrel rib.

It should be appreciated that the drive shaft can move vertically (but not horizontally) in the guide bearings. This vertical movement permits expansion of the tower without binding or otherwise compromising the performance of the drive mechanism.

I have also determined that the foregoing structure has the advantage of counteracting forces that provide an automatic mechanism for regulating the speed of rotation, effectively dispensing with the need for a separate governing apparatus. For example, it has been noted in testing that the maximum speed is 118 revolutions per minute in an approximately 80 mile per hour wind. If it were acting as an anemomoter the revolutions per minute would be greatly in excess of 118. A rule of thumb is 7 revolutions per minute per mile per hour wind velocity.

It also appears that in some fashion the structure equalizes wind pressure on the tower. There appears to be no appreciably greater force exerted on the tower on the windward than on the leeward side. This was demonstrated by using four guy cables on four sides and noting grossly the relative tension on each cable. All cables appeared to be about the same tension in the 80 mile per hour wind. The tower and turbine presents approximately 112 square feet of surface area, in one direction. Nevertheless, the tower sways only slightly, as a tree in the wind, but no appreciably greater bending pressure appears to be exerted on the windward side than the leeward side.

BRIEF DESCRIPTION OF THE DRAWINGS

Turning now to the drawings from which a fuller understanding of the invention may be had in conjunction with the reading of the written specification herein:

FIG. 6 is an enlarged plan view of the view of FIG. 5 taken along the lines 6—6.

DETAILED DESCRIPTION OF THE PREFERRED EMBODIMENT

Figure 1:
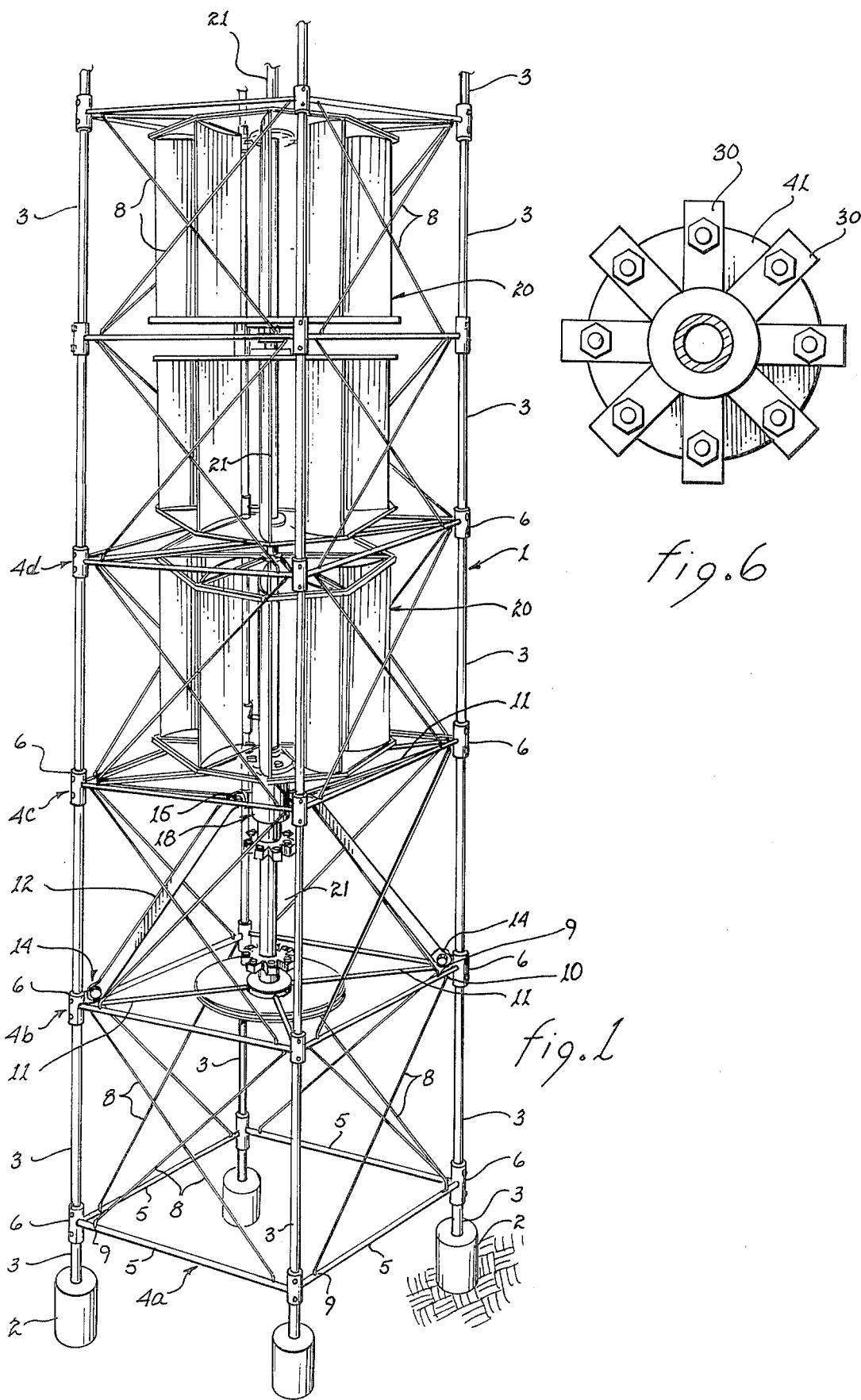
FIG. 1 is a perspective view of a presently preferred embodiment of the invention.

In FIG. 1 wherein the frame is generally indicated as 1, the foundation 2 is concrete poured around the standards 3 which have been leveled in place prior to the pouring.

Figure 5:
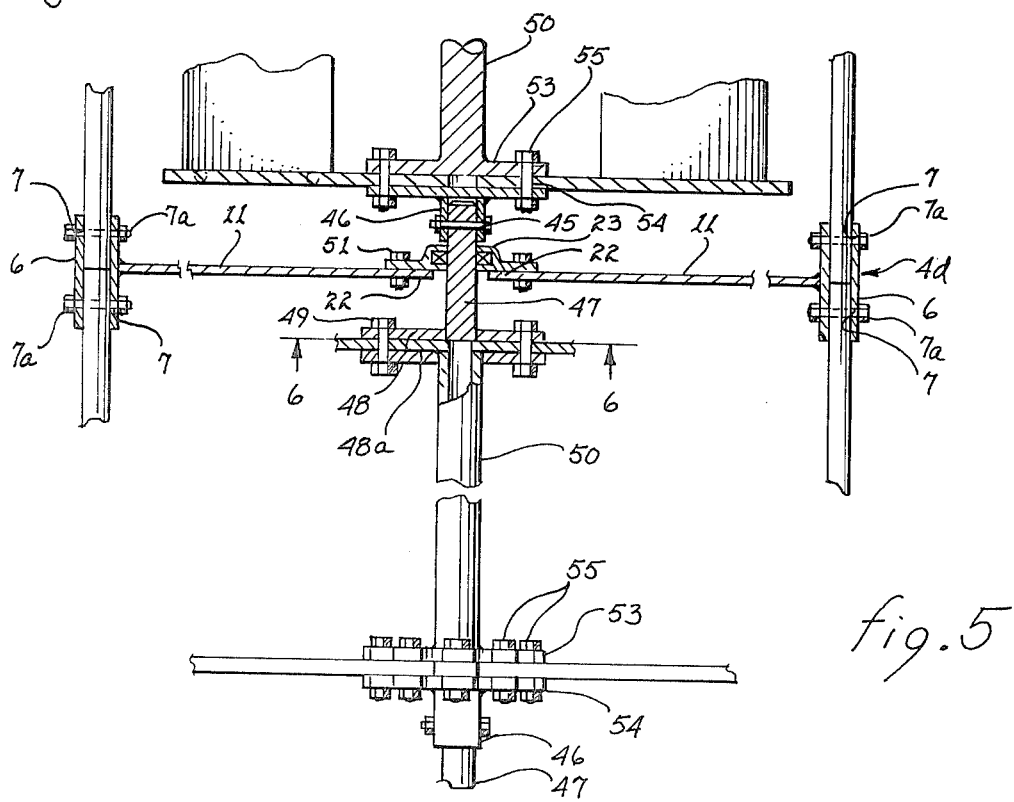
FIG. 5 is the view of FIG. 4 taken along the lines 5—5.

The stretcher assemblies 4 are the horizontal elements of the frame 1 and tie the standards 3 together. They vary in certain details in the first four levels which have been indicated as 4a, 4b, 4c and 4d. Common to each variation of the stretcher assembly are the stretchers 5 which extend at each corner to vertical sleeves 6 to which the stretchers are joined by welding. In this embodiment each sleeve 6 is provided with two apertures 7 for the reception of bolts 7a, as best seen in FIG. 5.

Cross braces 8 extend from a first inner aperture 9 on one stretcher to a second outer aperture 10 on the next upper set of stretchers. In stretcher assembly 4a only one aperture 9 is provided to avoid the possibility that workmen assembling the apparatus may start it incorrectly. The braces 8 are made in a jig by welding threaded bolts at the heads to ends of steel rod stock at the appropriate angle.

Stretcher assembly 4b is distinguished from stretcher assembly 4a in that 4b is provided with ribs 11 which extend inwardly toward the center of the frame, the purpose of which will be elaborated presently.

Figure 2:
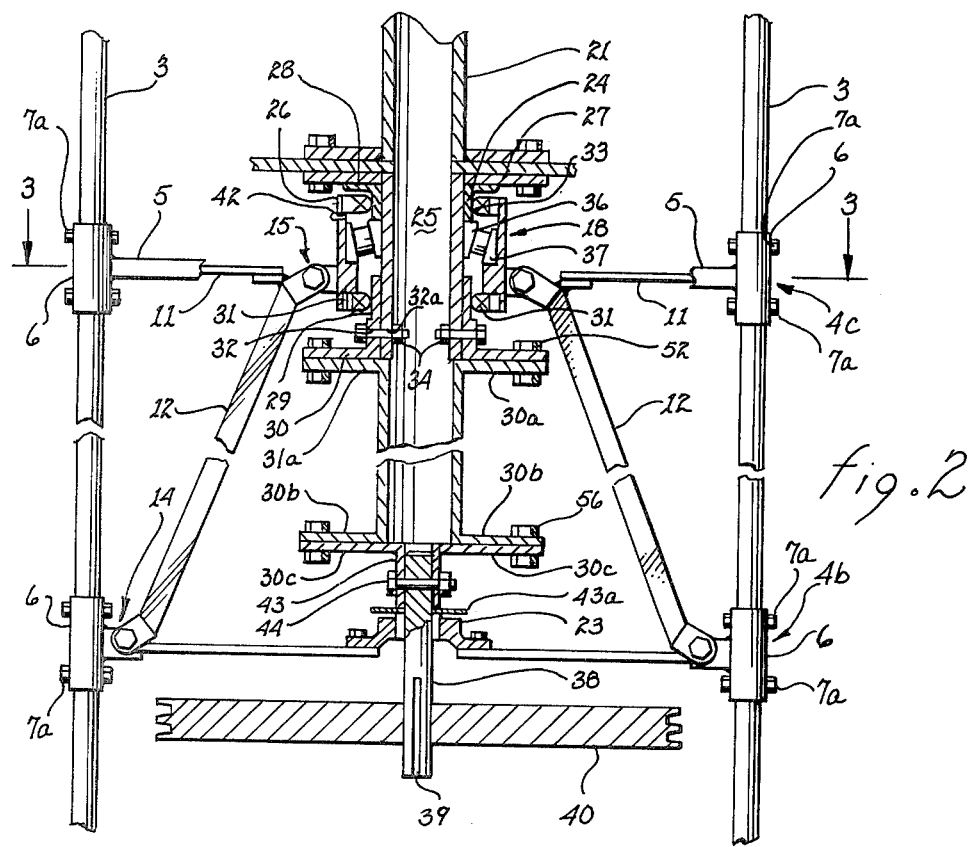
FIG. 2 is an enlarged portion of the view of FIG. 1 in section.
Figure 3:
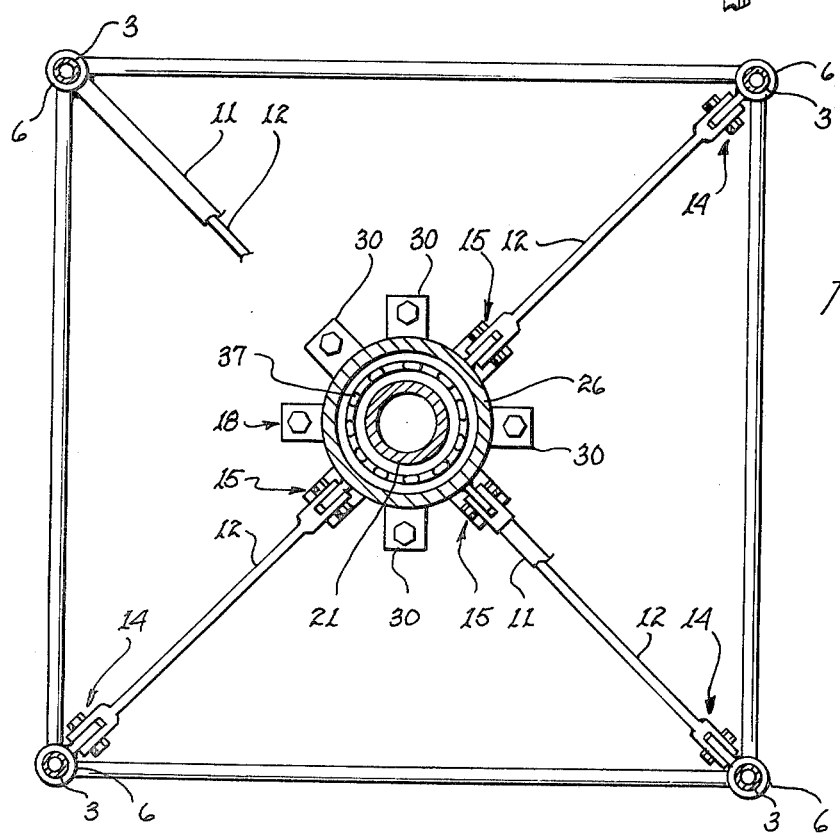
FIG. 3 is the view of FIG. 2 taken along the lines 3—3.

As may be more clearly seen in FIGS. 2 and 3, arms 12 which are journalled in an outer clevis 14 welded to the sleeve 6 of stretcher assembly 4b. The arm 12 extends upwardly to journal in the walls of inner clevis 15 which is welded to thrust bearing assembly 18.

Stretcher 4c differs from stretcher assembly 4a in that the ribs 11 are provided and (as in 4b) are welded to sleeve 6, but unlike stretcher assembly 4b, stretcher assembly 4c has no need of the clevis 14 which is welded to stretcher assembly 4b. The 4c ribs are attached to the upper elbow of the arm 12.

Stretcher assembly 4d differs from 4c in that the ribs 11 are attached to the guide bearing assembly 23 instead of to the arm 12 as is the case in 4c.

Thrust bearing assembly 18 supports the upper reaches of drive shaft 21 which in turn supports turbines 20 carried by the drive shaft. The inner ends 22 of ribs 11 engage guide bearings assembly 23 disposed axially in guiding relationship to the drive shaft 21, as may be better seen in FIG. 5 and as will be explained in greater detail hereafter.

As can be readily visualized from the drawings and the foregoing teachings of this disclosure, the height and number of turbine units of the invention can be extended at will to accommodate any particular type of use and power requirement made by the project under consideration. A single thrust bearing assembly can safely carry seven turbines above it. For higher units additional thrust bearing assemblies must be provided for each increment over seven turbines.

Turning now to FIG. 2 in which a detailed representation of the thrust bearing assembly is shown, the view includes stretcher assemblies 4b and 4c as seen in FIG. 1. A portion above and a bit below each one of those assemblies is shown with the area between 4b and 4c truncated for convenience. Also for convenience, the turbine 20 which would normally appear just above stretcher assembly 4c is omitted.

The thrust bearing assembly which supports drive shaft 21 has a collar 24 machined on its outside surface to serve as the inside running surface of the oil seal 33 which can be obtained from Federal-Mogul, Southfield, Mi. 48076, oil seal part No. 455009. The inside is machined to the outside diameter of axle 25. The main thrust bearing axle 25 is two-inch double strength steel pipe, machined to an outside diameter to accommodate bearing cone 36, in this instance Bower IBCA Model 388A. Using a jig to position the axle 25 and tabs 27, the latter are welded to the axle 25. Collar 24 which has been appropriately relieved to accommodate the weld, is then placed on and welded in place. Washer 28 and weld tabs 27 are welded to the collar 24 on both sides.

The outside diameter of collar 24 is turned to fit the inside diameter of seal 33. The outer casing 26 is constructed of 3½ inch extra heavy-duty steel pipe which is machined inside to a longitudinal depth of 1½ inches from the end to fit the outside diameter of bearing cone 36. It is next cut 9/16 inch deep from the same end to fit the outside diameter of seal 33. At the other end of outer case 26, the inside diameter is machined 9/16 inch longitudinal distance to fit the outside diameter of seal 31. Aperture 42 is bored and fitted with a grease fitting.

Collar 29 is machined in the same manner that collar 24 was machined to receive an oil seal 31 (Model 455009 id) and is welded to tabs 30 in a like manner. Apertures 32 and 32a are provided in collar 29 and axle 25 respectively to receive bolts 34. In assembling the thrust bearing assembly, one should first press bearing cup 37 on axle 25. Then place the bearing cone 36 which includes the race and balls into outer casing 26, then press the seal 33 on to axle 25 and seal 31 into outer casing 26. The inside axle assembly is then placed in the outer case assembly and bolts 34 are placed in apertures 32 and 32a.

All tolerances are not greater than 1/1,000 inch. Tabs 15 are welded on outer casing 26 to full penetration, i.e., to ⅛ inch on each side of the ¼ inch tab. All welds should be not less than ⅛ inch penetration and ¼ inch stock.

Extending downward from the thrust bearing assembly 18 is a two inch pipe 19 to which tabs 30a are welded at its upper end. Tabs 30a are fastened to the tabs 30 by means of bolts 52 inserted in suitable bores provided in the tabs. The shaft 19 has at its lower end tabs 30b which are welded to the shaft and which engage tabs 30c by means of bolts 56 in a manner like the upper end. Tabs 30c are welded to a solid one inch outside diameter cold rolled steel shaft 38 which is milled at its lower end 39 to receive a spline associated with drive pulley 40 which serves as the power take-off means. The power take-off shaft 38 is journalled in guide bearing 23 which in this embodiment is a model UCF 205-16 made by Asaahi Seido, Ltd., Japan. The guide bearing 23 is protected by slinger 41 and the power take-off shaft 38 is attached to connector pipe 43 by means of suitable apertures drilled therein to receive bolt 44.

In FIG. 5 a typical guide bearing axle 47 is shown. The axle 47 is made of one inch cold rolled steel which is welded (with the aid of a jig) to tabs 48 which are secured to tabs 48a by means of bolts 49. Tabs 48a are in turn welded to turbine axle 50. As also can be seen in FIG. 5, the guide bearing 23 is positioned around axle 47 and is prevented from moving laterally by its affixation to ribs 11. Ribs 11 are attached to sleeves 6 by welding and to the guide bearing 23 by suitable apertures which register to receive bolts 51.

In FIG. 5 the repeating components designated as turbine axles 50 are shown at the top and the bottom of the Figure. Tabs 53 are secured to tabs 54 in each case by bolts 55. Sleeve 46 is secured to guide bearing axle 47 by means of suitably positioned apertures which receive retaining bolts 45.

By way of clarification, although they pertain to different segments of the structure, the tabs 30, 30a, 30b and 30c, 53, 54, 48 and 48a are all constructed on the same jig and are actually interchangeable. Differing numbers having been given to them simply for the purpose of identifying more readily the particular areas under discussion. A typical tab arrangement is shown in FIG. 6 where the tabs are designated 30 and wherein a slinger 43 is placed below the tabs to protect the guide bearing 23 from water. This would be a typical construction over a guide bearing 23.

Figure 4:
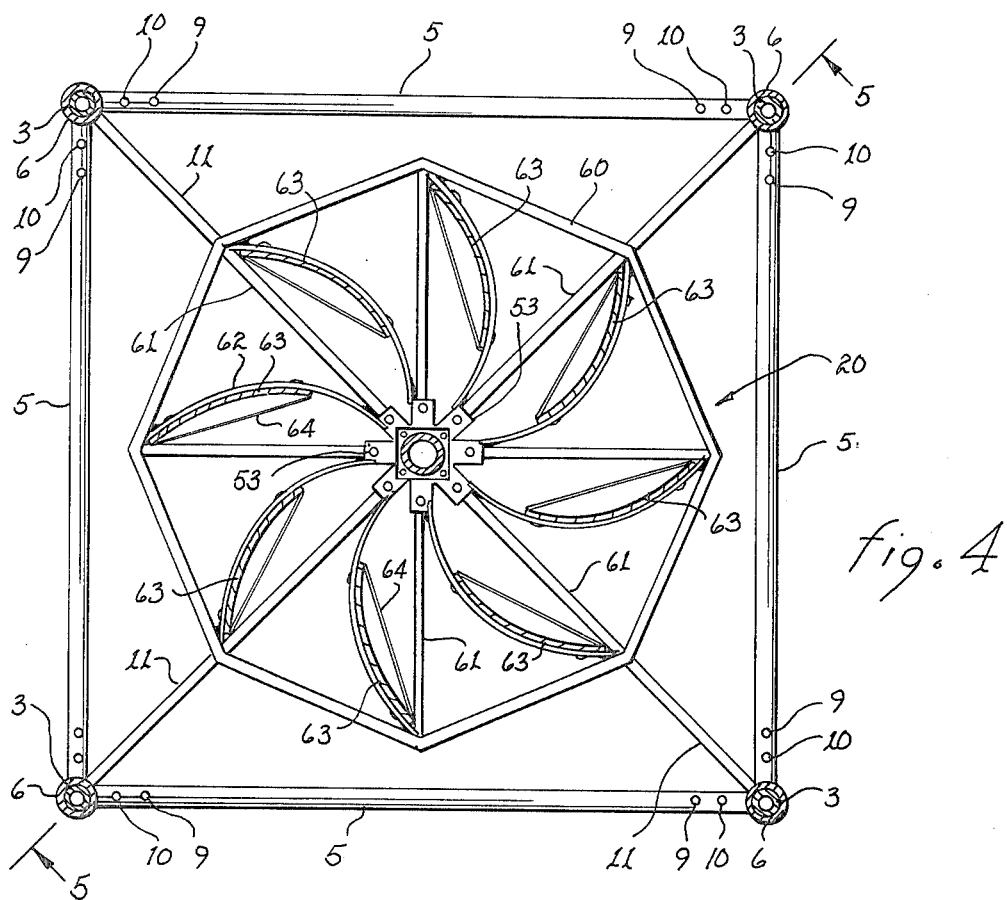
FIG. 4 is an enlarged plan view of the device of FIG. 1.

Turning now to FIG. 4, wherein a typical turbine plan view is illustrated, the wheel 60 has spokes 61 running to tabs 53 to which they are connected by bolts. Vane guides 62 are welded to the opposite ends of adjacent spokes; and vanes 63 are attached to vane guides by bolts and reinforced by braces 64.

The apparatus may be provided in kit form for assembly by ordinary workmen under the direction of a competent foreman, with a resulting savings in labor costs.

It will be apparent to persons ordinarily skilled in the art from the foregoing teachings of this specification that certain equivalent variations, modifications and improvements of the invention may be made within the spirit of this invention which is limited only by the appended claims.

What is claimed is:

1. A vertical axis wind turbine apparatus comprising:
   (a) a vertically rising exoskeletal frame comprising at least three vertical standards, a plurality of sets of at least three horizontal stretchers including radial ribs peripherally integrating said standards, and means for bracing said frame elements;
   (b) drive shaft guide means;
   (c) drive shaft support means comprising at least three upwardly and radially-inward extending arms attached at their first ends to and supported by said frame at the junctures of said stretchers and standards at one level and a thrust bearing axially disposed about said drive shaft and supportably attached to the second ends of said arms at a second level, said second ends of second arms being attached to the radial ribs at said second level;
   (d) a drive shaft axially supported and guided by said support and guide means respectively; and
   (e) at least one turbine carried by said drive shaft within the perimeter of said frame.

2. The apparatus of claim 1 with the addition of means for detachably connecting said vertical standards to said sets of stretchers.

3. The apparatus of claim 2 wherein said means for detachably attaching said vertical standards to said sets of stretchers comprises vertical sleeves integral with said stretchers adapted to receive the ends of standards supporting and rising from each set.

4. The apparatus of claim 2 wherein said drive shaft comprises joined detachable segments.

5. The apparatus of claim 1 wherein said cross braces connect each of said sets of stretchers to at least one other set of stretchers.

6. The apparatus of claim 1 with the addition of means for bracing said vanes intermediate the ends thereof.

7. The apparatus of claim 6 wherein the means for bracing said vanes is a plurality of stringers attached to their lengthwise edges.

8. The apparatus of claim 1 wherein said means for bracing said frame comprises cross braces joining each of said sets of stretchers to at least one other set of stretchers.

9. The apparatus of claim 1 wherein said guide means comprise a plurality of ribs radially converging from the periphery of said frame and axially disposed guide bearings carried by said ribs on the converging ends thereof, said guide bearings adapted to permit longitudinal movement of the shaft relative said frame.

10. The apparatus of claim 1 wherein said turbine comprises an upper wheel and a lower wheel each having a rim, a hub and a plurality of spokes connecting said rim and hub, a plurality of curved vane guides on each wheel extending from said rim to said hub, and curved vanes attached to and shaped by said vane guides; said vanes being shorter than said vane guides and extending from the perimeter of said wheel axially inward without touching said shaft, thereby leaving an open space around said shaft.

* * * * *